Patented May 2, 1933

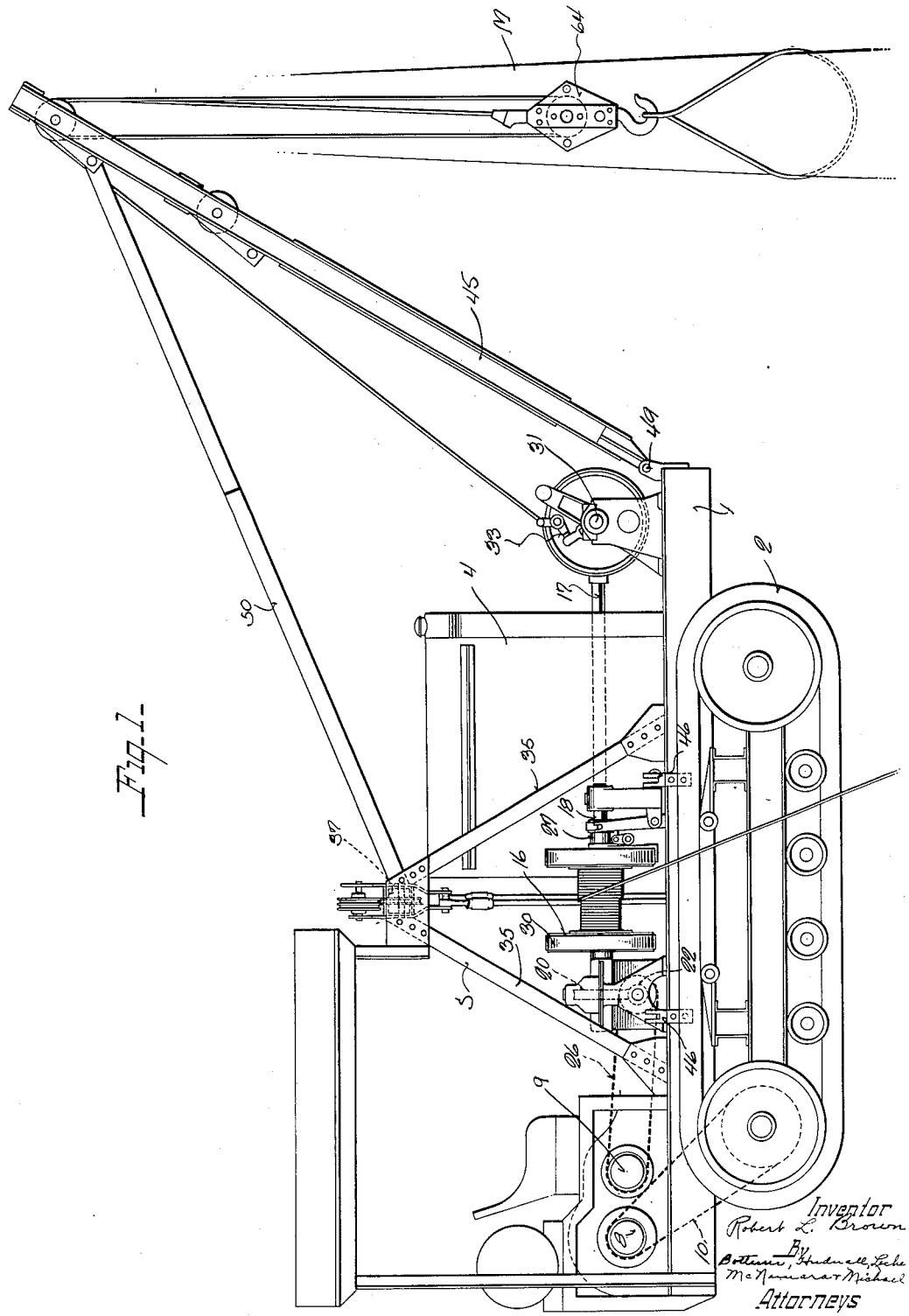

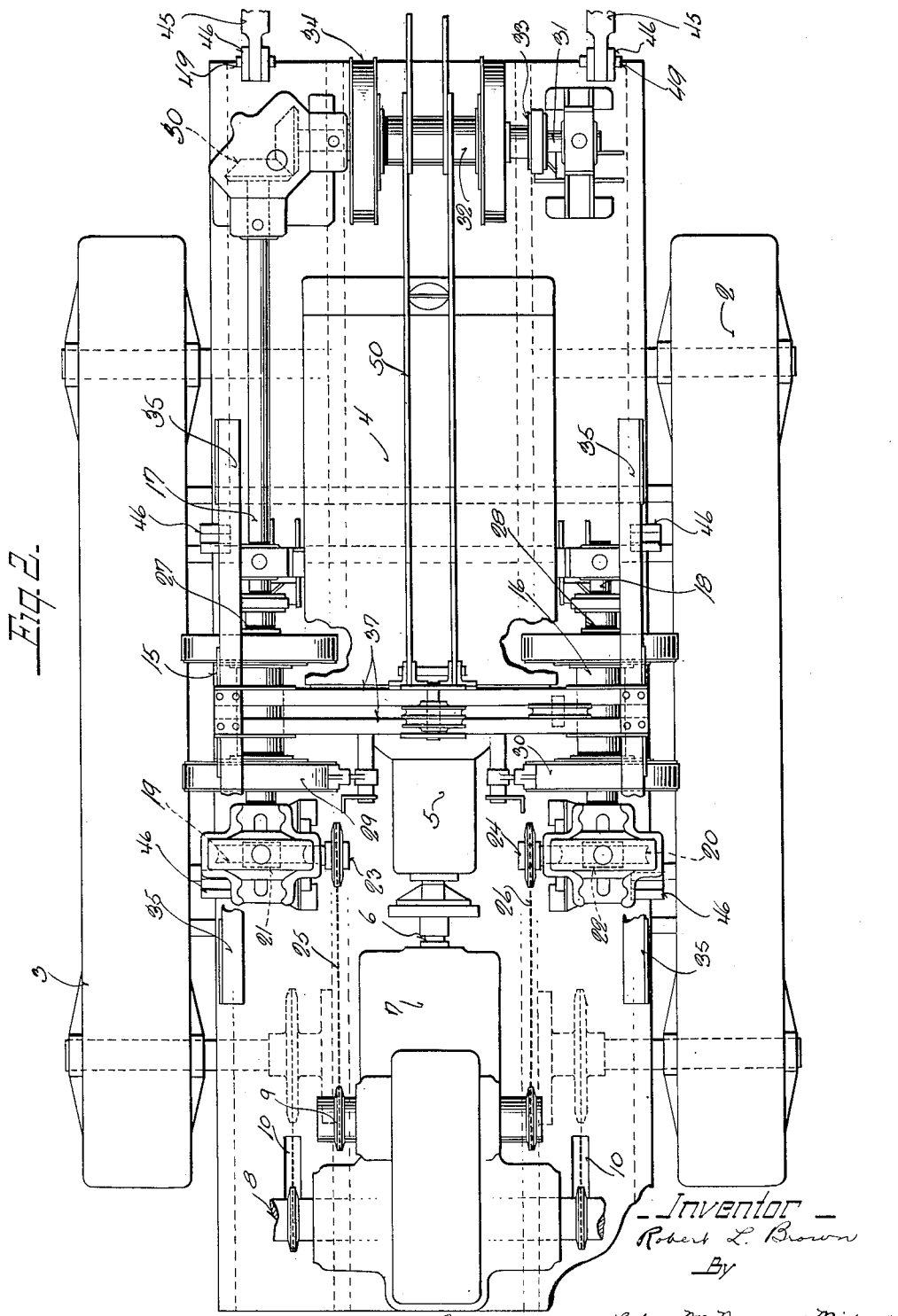

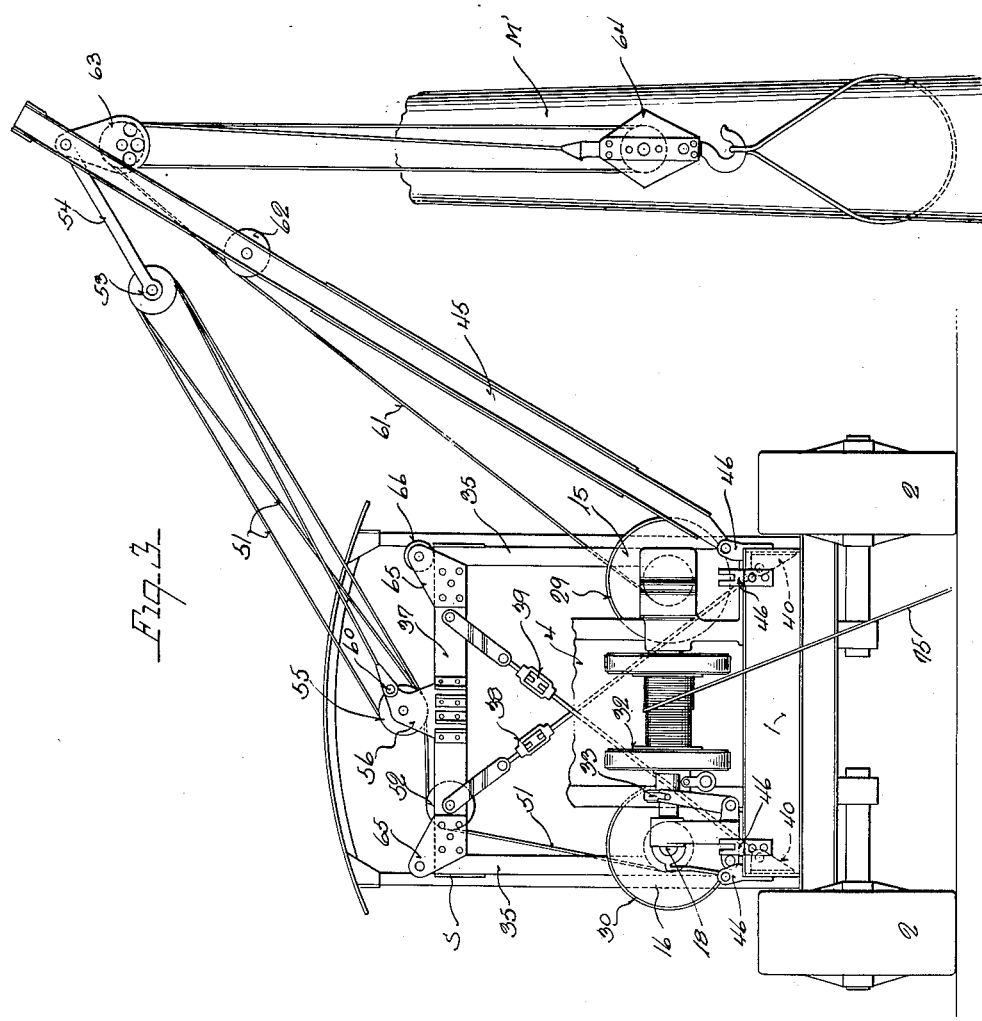

1,906,362

UNITED STATES PATENT OFFICE

ROBERT L. BROWN, OF MILWAUKEE, WISCONSIN, ASSIGNOR TO HARNISCHFEGER CORPORATION, OF MILWAUKEE, WISCONSIN, A CORPORATION OF WISCONSIN

PIPE HANDLING MACHINE

Application filed March 11, 1931. Serial No. 521,673.

This invention relates to a machine for handling pipe and is especially designed for use on field operations such as truck unloading, stringing, lining, stabbing, and lowering in pipe, as well as in any or all of the operations involved in the laying of gas and oil lines. In recent years the length and diameter of a pipe employed in gas and oil lines has increased considerably and the present invention provides a heavy duty machine capable of economically and efficiently carrying out the various handling operations involved in such lines.

One of the principal objects of the present invention is to provide a machine of this character which is so constructed and organized as to be capable of simultaneously carrying out the combined operations frequently necessary in the laying of pipe of this kind. For example, when joining a welded pipe section of several hundred feet in length to the main line, the abutting end of the pipe section must be lowered accurately into alinement with the end of the main line and the entire pipe section must be moved axially until the abutting end is in proper position for welding to the main line. Heretofore it has been necessary to employ two machines for this operation. The present invention is so constituted as to be well adapted to carry out not only the lowering of the pipe for alinement but also the axial or longitudinal shifting of the pipe to a proper position for welding.

Other objects are to provide a pipe handling machine of this character in which the boom may be interchangeably employed at the front end or at either side of the machine and wherein the boom, when employed at the side of the machine may be quickly adjusted to any desired working angle under the control of the power boom hoist mechanism. The several drums of the machine are driven at variable speed and power ratios from the selective change speed gear transmission employed between the power plant and the traction devices.

A still further object is to provide a machine of this character and having these advantages and capacities and which is of simple and durable construction, reliable and effective in operation, easy and comparatively inexpensive to manufacture and which further has adequate lifting capacities and yet is capable of easy, smooth and rapid maneuvering in order to meet all of the various conditions found in the field.

Other objects and advantages reside in certain novel features of the construction, arrangement and combination of parts which will be hereinafter more fully described and particularly pointed out in the appended claims, reference being had to the accompanying drawings forming a part of the specification, and in which:

Figure 1 is a view showing the machine in side elevation with the boom employed at the front end thereof;

Figure 2 is a plan view of the machine; and

Figure 3 is a view thereof in front elevation and showing the boom employed at the side of the machine.

Referring to the drawings, it will be seen that the machine embodying the present invention comprises a frame 1 supported on traction devices 2 and 3 of the self-laying track type. The power plant 4 is supported on the frame 1 and exerts its drive through a change speed gear set 5 of the selective type. A drive line 6 extends rearwardly from the change speed gear set 5 into a gear casing or housing 7 and within the housing 7 is suitably geared to shafts 8 and 9. The shaft 8 is connected by chain and sprocket gearing 10 to the traction devices 2 and 3. The shaft 9 is employed to drive the drum assembly which will now be described.

Centrally of the machine and at the opposite sides of the frame 1 drums 15 and 16 are provided and are rotatably supported on shafts designated at 17 and 18 and mounted for free rotation in bearings provided therefor on the frame. The rearward ends of the shafts 17 and 18 have worm wheels 19 and 20 keyed thereto, the worm wheels 19 and 20 meshing with worms 21 and 22 which are carried on short transverse shafts 23 and 24 rotatably supported in bearings provided therefor on the frame. The inner ends of the shafts 23 and 24 are connected by chain and sprocket gearing 25 and 26 with the shaft 9. The drum 15 may be clutched to its shaft 17 and caused to be rotated therewith by means of a manually operable clutch 27 and the rotation of the drum 16 is similarly controlled by means of a clutch 28 provided between the drum 16 and its shaft 18. Manually operable brakes 29 and 30 are provided for the drums 15 and 16, respectively, to retard the rotation of these drums or hold them against rotation when they are unclutched from their respective shafts. As will be clearly seen from Figure 2, the shaft 17 extends along its side of the frame to the forward end of the frame and the forward end of the shaft 17 is connected by beveled gears 30 with a transverse drum shaft 31 on which a drum 32 is loosely mounted. The drum 32 may be clutched to its shaft 31 when desired by means of a clutch 33 and may be held against rotation by a manually operable brake 34.

In order to adapt the machine for use with the boom and to provide for the selective use of the boom at the front end or at either side of the machine a superstructure preferably in the form of an A-frame and designated generally at S is provided on and securely fastened to the main frame 1. The superstructure S consists of a pair of upwardly converging legs 35 arranged at each side of the main frame 1, fastened at their lower ends to the main frame and securely interconnected at their upper ends with a top member or cross member in the form of a pair of spaced transversely extending channels 37. As shown in Figure 3, the superstructure S is braced transversely by means of oppositely inclined or diagonal adjustable brace members 38 and 39, the upper end of each brace member being fastened to the channels of the cross member and the lower end of each brace member being fastened to an attaching bracket 40, secured to the frame 1.

A boom designated generally at 45 is provided and may be selectively employed at the front end of the machine as shown in Figure 1 or at either side of the machine. Figure 3 shows the boom employed at one side of the machine. In carrying out this interchangeable use of the boom at either the front or sides, the frame of the machine is provided at the front with two pairs of boom supporting lugs designated at 46 and is also provided at each side, with two pairs of such boom supporting lugs. At the sides of the machine there is a pair of boom supporting lugs 46 just below the lower end of each leg 35 of the superstructure. The boom has spaced attaching portions or feet at its lower end and these feet, as well as the lugs 46, are formed with openings adapted to receive the removable pins 49. When the boom is employed at the front of the machine it is supported in position by a tie member 50 extending between the central portion of the superstructure and a selected point on the boom. However, when the boom is employed at either side of the machine its working angle may be readily adjusted inasmuch as one or the other of the drums 15 or 16 is adapted under such circumstances to constitute a boom hoist drum. Thus, as shown in Figure 3, the cable 51 from the drum 16 is extended up over a pulley 52 rotatably mounted between the channel bars 37 and is then extended up to a sheave assembly 53 connected by links 54 to the boom and then back around a sheave assembly 55 mounted on brackets 56 secured to the channels 37 again up and then around the sheave assembly 53 carried by the links and back to the brackets 56 on which it is dead-ended as at 60. The drum 15 has its cable 61 extended up over a roller 62 mounted on the boom and then trained through the blocks 63 and 64 of the hoisting tackle.

At each side of the upper end of the top or cross member of the superstructure S bracket plates 65 are provided and serve as a mounting for a roller 66, the roller 66 being selectively employed with one or the other of the sets of the mounting plates 65. In Figure 3 the roller is at the right hand side and its function is to engage the runs of the hoist cable 51 when the boom is lowered to a marked extent. The boom may be employed at the opposite side of the machine from that at which it is shown in Figure 3 by simply rearranging the cables 51 and 61, shifting the boom over to the other side and shifting the roller 66 to the other set of brackets.

With the boom employed at one side of the machine, it may be utilized to raise and lower the pipe section M to be welded to a main line and the cable 75 of the front drum 32 may be employed for snaking the section M along the skids, that is, shifting the section M longitudinally until the end to be joined to the main line is in proper position for welding or other manner of connection.

The machine may also be converted into a back filler by employing a tie member similar to the tie member 50 between the brackets 56 of the superstructure S and the boom 45 with the boom arranged at the side of the machine as shown in Figure 3 and then utilizing the cable 51 from the drum 16 as the hoist line for the scraper and the cable 61 from the drum 15 as a drag line.

The invention claimed is:

1. A machine for handling pipe comprising a frame, traction devices supporting the frame, drums mounted on the frame at the side and front thereof and supported for rotation about axes disposed substantially at right angles to each other, means for selectively driving said drums, a boom mounted on the frame adjacent one of said drums and having hoisting tackle actuated by the drum adjacent thereto and cooperable with a pipe section for raising and lowering the same, and means actuated by the other of said drums and cooperable with said pipe section for shifting the same longitudinally.

2. A machine for handling pipe including a frame, traction devices supporting the frame, drums arranged at the side and front of the frame, a boom arranged at the side of the frame and having hoisting tackle controlled from a drum at the side of the frame whereby the hoisting tackle may be operated to raise and lower a pipe section and means actuated by the drum at the front of the frame for shifting the pipe section longitudinally.

3. A machine of the character described comprising a frame, traction devices supporting the frame, a power plant mounted on the frame, motion transmission means between the power plant and the traction devices, drums arranged at the sides of the machine, drum shafts loosely supporting said drums, clutches between the drum shafts and the drums, gearing for actuating the drum shafts from said motion transmission mechanism, and a boom supported at the side of the machine and raised and lowered from one of said drums and having hoisting tackle operated from the other of said drums, and a front drum assembly at the front of the machine including a drum shaft and a drum rotatably supported thereon, a clutch between the drum and the drum shaft of the front drum assembly and motion transmission means between said last mentioned drum shaft and one of the drum shafts at the side of the machine.

4. A machine of the character described comprising a frame, traction devices supporting the frame, a superstructure including a pair of upwardly converging legs at the side of the machine, a cross member connecting the upper ends of the legs at each side of the machine, diagonal braces between the cross member and the frame, a drum assembly adjacent each pair of legs, a boom mounting at each side of the machine, a boom selectively cooperable with said mountings and having hoisting tackle and cable means operable from the drums for raising and lowering the boom and actuating the hoisting tackle thereof, said cross member having means for properly deflecting the elements of the cable means utilized for raising and lowering the boom in either position of the boom.

5. A machine for handling pipe including a frame, traction devices supporting the frame, drums arranged at the sides and front of the machine, a boom arranged at a side of the frame and having hoisting tackle controlled from one of the drums at the side of the frame, whereby the hoisting tackle may be operated to raise and lower a pipe section, cable means actuated from the other drum at the side of the machine and cooperable with the boom for raising and lowering the same, and means actuated by the drum at the front of the frame for shifting the pipe section longitudinally.

In witness whereof, I hereto affix my signature.

ROBERT L. BROWN.